United States Patent [19]
Rock et al.

[11] Patent Number: 5,547,733
[45] Date of Patent: Aug. 20, 1996

[54] PLAITED DOUBLE-KNIT FABRIC

[75] Inventors: Moshe Rock, Andover; Douglas Lumb; William Lie, both of Methuen, all of Mass.

[73] Assignee: Malden Mills Industries, Inc., Lawrence, Mass.

[21] Appl. No.: 459,615

[22] Filed: Jun. 2, 1995

[51] Int. Cl.$^6$ .................. B32B 5/08; B32B 5/26; B32B 7/02; B32B 33/00

[52] U.S. Cl. .................. 428/91; 2/78.1; 2/400; 428/92; 428/97; 428/213; 428/219; 428/225; 428/230

[58] Field of Search .................. 428/91, 92, 97, 428/219, 225, 230, 213

[56] References Cited

U.S. PATENT DOCUMENTS

| | | |
|---|---|---|
| 4,733,546 | 3/1988 | Toda . |
| 5,217,782 | 6/1993 | Moretz .................. 428/91 |
| 5,312,667 | 5/1994 | Lumb et al. . |
| 5,344,698 | 9/1994 | Rock et al. . |

*Primary Examiner*—James C. Cannon
*Attorney, Agent, or Firm*—Gottlieb, Rackman & Reisman, P.C.

[57] ABSTRACT

A composite textile fabric for rapidly moving moisture away from the skin is provided. The composite fabric includes an inner fabric layer made of a yarn comprising a plurality of fibers primarily of polyester which has been rendered hydrophilic, and an outer fabric layer made of a yarn comprising a plurality of fibers primarily of polyester which has also been rendered hydrophilic. The inner fabric layer and the outer fabric layer are formed concurrently by knitting a plaited construction so that the layers are distinct and separate, yet integrated one with the other.

15 Claims, No Drawings

PLAITED DOUBLE-KNIT FABRIC

BACKGROUND OF THE INVENTION

This invention relates to a composite textile fabric, and more particularly, to a composite textile fabric made of polyester yarns which act to move liquid moisture away from the skin and through a garment made with the composite fabric.

Most polyester textile fabrics are likely to result in the substantial enclosure of liquid moisture between the wearer's skin and undergarments, or between the undergarments of the wearer and the outerwear. When moisture saturation takes place, the excess moisture wets the body of the garment wearer, and the wearer begins to feel rather uncomfortable.

Although it is possible to use a composite textile fabric with a first layer made of either a polyester or nylon material and a second layer having a substantial portion of a moisture-absorbent material such as cotton, as by way of example illustrated in U.S. Pat. No. 5,312,667 owned by Malden Mills Industries, such a composite textile fabric can be improved. Because the second layer includes a substantial portion of a moisture-absorbent material such as cotton, even though the "micro-climate" between the wearer's skin and the inner fabric layer is more comfortably dry and the likelihood of a back-up of liquid moisture from the outer fabric layer to the inner fabric layer is reduced, moisture evaporation from the outside layer is less than desired. The moisture absorbent material becomes saturated, but since there is little driving force to spread the moisture, evaporation is limited and the excess moisture backs up into the inner layer and wets the wearer.

Accordingly, it would be desirable to provide a textile fabric which overcomes the above disadvantages and which facilitates water transport across the outside layer to promote evaporation and keep the wearer dry.

SUMMARY OF THE INVENTION

Generally speaking, in accordance with the invention, a composite textile fabric for rapidly moving liquid moisture away from the skin and evaporating that moisture from the surface of its outer surface is provided. The composite fabric includes an inner fabric layer made of a yarn comprising a plurality of fibers of primarily polyester which have been rendered hydrophilic, and an outer fabric layer made of a yarn comprising a plurality of fibers of primarily polyester which have also been rendered hydrophilic. The polyester of the inner fabric layer may be a stretchable polyester such as ESP produced by Hoechst Celanese or DuPont's LYCRA to give the fabric elastic properties. The polyester of the outer fabric layer may be blended with a hygroscopic material such as cotton to enhance the fabric's capacity to absorb liquid moisture. The inner fabric layer and the outer fabric layer are formed concurrently by knitting a plaited construction so that the layers are distinct and separate, yet integrated with one another, and the fabric may be knit with an open mesh construction to give the fabric elasticity.

Significantly, the denier of the yarn fibers of the inner fabric layer and the outer fabric layer is in a ratio of between 1:1 and 1.45:1. As a result, moisture which collects along the inner fabric layer is transferred to the outer fabric layer as predicted for "wicking" by the Washburn equation (see E. A. Wulkow and L. C. Buckles, *Textile Research Journal*, 29:931 et seq., 1959), $$h = 2\gamma \cos \theta / rpg$$

where h=vertical height of wicking, $\gamma$= surface tension of the liquid, $\theta$= contact angle, r= radius of the tube, p=density of the liquid, and g= gravitational acceleration.

This "wicking" is the result of capillary action and is enhanced the finer the denier of the fiber of the outer fabric layer and the greater the difference in denier between the yarn fibers of the two layers.

In addition, the denier of the yarn (as opposed to the denier of the yarn fibers) of the inner fabric layer and the outer fabric layer is in a ratio of between about 1:1.10 and 1:5.0. This ratio facilitates the horizontal spread of liquid moisture in the outer fabric layer so that moisture is more evenly distributed along this layer, as described by Hollies and his co-workers (see N. Hollies and M. Kaessinger, *Textile Research Journal*, 26: 829–835, 1956 and 27:8–13, 1957), $$S^1 = \gamma \cos \theta_A r_e t/2 \eta$$

where $S^1$= horizontal distance traveled in time t, $\gamma$= surface tension of the liquid, $r_e$= effective radius, $\Theta_A$= an apparent advance contact angle, $\eta$= viscosity of the liquid, and t=time. This in turn further facilitates rapid evaporation of the moisture from the outer layer. The coarser yarn of the outer fabric layer increases that layer's liquid holding capacity and therefore the "sink effect" of the outer fabric layer which, in turn, facilitates rapid transfer of the liquid moisture from the wearer's skin thorough the inner fabric layer to the outer fabric layer.

In application, the composite textile fabric of the invention is used in a variety of garments, including sweatshirts, sweatpants, underwear, bathrobes, and various types of exercise clothing. The inner fabric layer is worn against the skin or undergarment of the wearer. Moisture from the skin is quickly transported through this layer where it is carried to the outer fabric layer where it spreads for evaporation from the outside of the garment (the surface of the outer fabric layer).

Of significance is the fact that the fabric construction is plaited. This feature makes it possible for capillary action to move liquid moisture from the wearer's skin through the inner fabric layer to the outer fabric layer and helps to create a substantial moisture concentration gradient between the inner fabric layer (which quickly transports water from the skin) and the outer fabric layer (from which the moisture is evaporated). The effect is to increase the outer fabric layer "sink effect" and reduce the likelihood of liquid moisture backing up into the inner fabric layer because of a lack of liquid moisture capacity in the outer fabric layer. Accordingly, it is an object of the invention to provide an improved composite textile fabric for enhancing the transport of liquid moisture away from the skin.

It is also an object of the invention to provide an improved composite textile fabric having a plurality of polyester fibers for conducting liquid moisture.

Another object of the invention is to provide an improved composite textile fabric which has a plaited construction for promoting the moisture concentration gradient between the two layers.

Yet another object of the invention is to provide a composite textile fabric in which the denier of the yarn fibers facilitates the transport of moisture from the inner fabric layer to the outer fabric layer.

A further object of the invention is to provide a composite textile fabric in which the yarn denier facilitates the horizontal spread of moisture along the outer fabric layer which further increases the "sink effect" of the outer fabric layer and reduces the likelihood of moisture back-up into the inner fabric layer.

Still other objects and advantages of the invention will in part be obvious, and will in part be apparent from the following description. For example, an additional object will be to give the fabric elasticity by replacing the polyester of the inner fabric layer with a stretchable polyester such as ESP produced by Hoechst Celanese or with DuPont's LYCRA, or the like, or by knitting the fabric with an open mesh construction, or to give it a higher capacity to absorb moisture by blending the polyester of the outer fabric layer with a hygroscopic material such as cotton.

The invention accordingly comprises the several steps and the relation of one or more of the steps with respect to each of the others, and the material or materials having the features, properties and relation of constituents which are exemplified in the following detailed disclosure, and the scope of the invention will be indicated in the claims.

DETAILED DESCRIPTION OF THE PREFERRED EMBODIMENT

The composite textile fabric of the invention includes an inner fabric layer made of yarn comprising a plurality of fibers of primarily polyester which have been rendered hydrophilic, and an outer fabric layer made of the yarn comprising a plurality of fibers of primarily polyester which have also been rendered hydrophilic. Both fabric layers are formed concurrently by knitting a plaited construction so that the layers are distinct and separate, yet integrated one with the other.

The inner fabric layer comprises between about 30 and 70 percent by weight of the fabric. The outer fabric layer comprises between about 70 and 30 percent by weight of the fabric. The amount of each fabric layer is selected based on the desired weight of the composite fabric, the end use desired of the composite fabric, and the specific requirements for transferring moisture from the inner fabric layer to the outer fabric layer. The weight per unit area of the composite fabric is between about 3 ounces/yard$^2$ and 15 ounces/yard$^2$, depending upon the use requirements for thermal protection and moisture control.

The construction of the composite fabric, as set forth above, is such that it has a plaited construction—although each fabric layer is distinct and separate, each is integrated with the other. As a result, the composite fabric functions as a single unit.

The composite fabric is constructed as a weft knit, such as a two-end fleece, three-end fleece, terry with regular plaiting and double terry.

Significantly, the denier of the yarn fibers of the inner fabric layer and the outer fabric layer is in a ratio of between about 1.45:1 and 1:1. This denier ratio facilitates the transport of liquid moisture which collects on the inner fabric layer to the outer fabric layer. When moisture collects on the first inner fabric layer, since the denier of the inner yarn fibers is at least as great as that of the outer yard fibers, and, therefore, the inter-fiber space in the yarn of the inner fabric layer is the same as or greater than that of the outer fabric layer yarn, the quick transfer of moisture from the first layer to the second layer due to capillary action is facilitated.

Also of significance is the fact that the denier of the yarn of the inner fabric layer and the yarn of the outer fabric layer is in a ratio of between about 1:1.10 and 1:5.0. This ratio facilitates the horizontal spreading of moisture along the outer layer—in other words, moisture collected by the inner fabric layer is transferred to the outer layer and more evenly distributed on the outer layer. As a result of the spreading along the outer fabric layer, overall moisture is more rapidly transported from the inner fabric layer to the outer fabric layer of the composite textile fabric, since there is a lesser build-up of moisture in specific fabric locations in the outer fabric layer. Also, because the yarn of the outer fabric layer is coarser than the yarn of the inner fabric layer, the likelihood of a "sink effect" in the outer fabric layer is increased and the likelihood of liquid moisture back-up into the inner fabric layer where it would wet the skin of the wearer, is reduced.

More specifically, the yarn fibers of the inner fabric layer are in a range of between about 1.5 denier and 2.5 denier, and the yarn fibers of the outer fabric layer are within a range of between about 1.5 denier and 2.5 denier.

The denier of the yarn (itself) of the outer fabric layer is in a range of between about 150 denier and 200 denier, while the denier of the yarn of the inner fabric layer is in a range of between 150 denier and 50 denier.

Preferably, the yarn of the inner layer is a small denier filament yarn and the yarn of the outer layer is a large denier spun yarn so that the spreading of liquid moisture along the surface of the outer layer is enhanced and the back up of liquid moisture to the inner layer is reduced. If the yarn of the outer layer is air jet spun, the outer layer will have, in addition, enhanced non-pilling characteristics.

Preferably, the surface of the inner fabric layer is lightly sanded, brushed or napped in order to slightly raise the fabric surface so that the garment is soft to the skin. However, care must be exercised to prevent excessive raising which would reduce the liquid moisture transport by capillary action.

In order to render each of the inner and outer layers hydrophilic, a material such as a low molecular weight polyester may be added to the dye bath that is used to dye each of the layers. Reference is made to U.S. Pat. No. 5,312,667 which is hereby incorporated by reference for its teaching and description of various types of low molecular weight polyesters that are suitable for the inventive composite textile fabric.

By chemically treating each of the fabric layers, each layer is rendered substantially hydrophilic. As a result, the transfer of water from the surface of the inner fabric layer to the outer fabric layer is enhanced—liquid moisture is made transportable along the surface of each polyester fiber. Moisture that has been conducted to the outer fabric layer spreads along the surface of the layer, is rapidly evaporated (it is not absorbed), and therefore, the outer fabric layer will rapidly dry.

Optionally, the polyester of the outer fabric layer may be further treated, for example, by topical application, such as by applying a low molecular weight polyester by padding, to render it more hydrophilic than the polyester of the inner fabric layer, thereby increasing the driving force or moisture transport from the inner fabric layer to the outer fabric layer.

Also, the outer fabric layer may have a hygroscopic fiber such as cotton or rayon blended with the polyester that has been rendered hydrophilic. As is well known, the capacity of cotton to absorb moisture increases as the ambient relative humidity increases. For example, at a relative humidity of 65%, cotton will absorb 7.4% moisture but at a relative humidity of 95%, it will absorb more than 13%. Hence, the cotton blended with the polyester can accommodate the extra moisture generated by the wearer, for example, during physical exertion, and the moisture level in the "microclimate" between the wearer's skin and the inner fabric layer can be kept at a dry and comfortable level, further increasing the comfort level of the wearer.

Furthermore, the surface area of the outer fabric layer fibers may be enlarged by a roughening process. Roughening is achieved by various proprietary treatments of the fiber such as illustrated by fibers available from Asahi Chemical Industry Co. Ltd. and Kurary Co. Ltd., both of Japan. This further enhances the drying properties of the outer fabric layer because the greater surface area of the fibers will provide for greater capacity for liquid moisture, deferring saturation thereof. The greater surface area also provides for a thinner film of moisture and greater ease of evaporation therefrom.

Preferably, in order to promote the non-pilling characteristics of the outer polyester fabric layer, the yarn fibers of the outer fabric layer are air jet spun when forming the yarn. As a result, a tighter yarn is created which is less susceptible to pilling since the yarn fibers are held more closely together. Moreover, the air jet spun yarn of the outer fabric layer will have a cotton-like look without being made from an all cotton or cotton-like material.

In order to further illustrate the composite textile fabric of the invention, the following example is provided.

EXAMPLE

A composite fabric made in accordance with the invention was knit on a circular knitting machine with a terry construction, 23 wales/inch and 30 courses/inch. The composite fabric had an inner polyester layer comprising 100% 70/34 denier textured yarn, the fiber denier of which is 2.06. The outer fabric layer comprised 100% 30/1 denier air jet spun polyester, the fiber denier of which is 1.5. The inner polyester layer comprised 30% by weight, while the outer layer comprised 70% by weight of the composite fabric. The weight per unit area of the composite fabric was 4.1 ounces/yard$^2$.

As can be appreciated, the denier ratio of the yarn of the inner fabric layer and the outer fabric layer was 2.5:1, and the denier ratio of the yarn fibers of the outer fabric layer and the inner fabric layer was in the ratio of 1:31.37.

A composite fabric made in accordance with the invention will have the following characteristics:

1. The inner fabric layer will absorb approximately 80% of its weight in moisture; the outer fabric layer will absorb approximately 270% of its weight in moisture.
2. Ten seconds after a drop of water is placed on the surface of the inner fabric layer it will have spread to encompass 1 in$^2$ of the inner fabric layer's surface, whereas it will have spread to encompass 2.75 in$^2$ of the outer fabric layer's surface; after 30 seconds the drop is no longer visible on the surface of the inner fabric layer and it will have spread to encompass approximately 3.5 in$^2$ of the outer fabric's surface.

A significant aspect of the inventive composite fabric is that there is nothing interposed between the two fabric layers. These layers are formed concurrently by knitting a plaited construction so that the layers are distinct and separate yet integrated one to the other. Together, the layers act to move moisture away from the skin and through a garment made with the composite fabric by capillary action, enhanced by the creation of a moisture concentration gradient. Evaporation into the exposed air from the surface of the outer layer sets up the gradient. The differences in yarn fiber denier and yarn denier serve as the driving force to move or transport the moisture through the fabric.

It will thus be seen that the objects set forth above, and those made apparent from the preceding description, are efficiently attained, and since certain changes may be made in the products set forth above without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A composite textile fabric comprising an inner fabric layer made of a yarn comprising a plurality of fibers of polyester which have been rendered hydrophilic and an outer fabric layer made of a yarn comprising a plurality of fibers of polyester which have also been rendered hydrophilic;

wherein the denier ratio of the yarn fibers of the first inner fabric layer to those of the second outer fabric layer is between about 1:1 and 1.45:1;

wherein the denier ratio of the yarn of the first inner fabric layer to that of the second outer fabric layer is between about 1:1.10 and 1:5.0;

wherein the first inner fabric layer and second outer fabric layer are formed concurrently by knitting a plaited construction so that there is nothing interposed between the first and second fabric layers.

2. The textile fabric of claim 1, wherein said inner fabric layer has a raised surface.

3. The textile fabric of claim 1, wherein the yarn of the outer fabric layer is spun.

4. The textile fabric of claim 1, wherein the yarn of the outer fabric layer is air jet spun.

5. The textile fabric of claim 1, wherein said fabric has a construction selected from the group comprising two-end fleece, three-end fleece, terry with regular plaiting, double terry, and tricot.

6. The textile fabric of claim 1, wherein the inner fabric layer comprises between about 10 and 60 by weight of the fabric and the second outer fabric layer comprises between about 90 and 40 by weight of the fabric.

7. The textile fabric of claim 1, wherein the fabric has a weight per unit area of between about 3 ounces/yard$^2$ and 15 ounces/yard$^2$.

8. The textile fabric of claim 1, wherein each of the polyester fibers have been rendered hydrophilic.

9. The textile fabric of claim 1, wherein the polyester fibers of the outer fabric layer are more hydrophilic than the polyester fibers of the inner fabric layer.

10. The textile fabric of claim 1, wherein the outer fabric layer has a surface which is enlarged by roughening the surface of the yarn fiber.

11. The textile fabric of claim 1, wherein the outer fabric layer includes yarn fibers made of cotton or other hygroscopic fibers that are blended with the yarn fibers made of a polyester material.

12. The textile fabric of claim 11, wherein the cotton or other hygroscopic fibers are in an amount between about 5 and about 30 percent as compared to the total amount of fibers in the yarn of the outer fabric layer.

13. The textile fabric of claim 1, wherein the material of each of said layers is polyester.

14. The textile fabric of claim 1, wherein the polyester fibers of the inner fabric layer are a material that gives the fabric elastic properties.

15. The textile fabric of claim 1, wherein each of the fabric layers is knitted in an open mesh construction.

* * * * *